United States Patent [19]

Yamamura et al.

[11] 4,387,454
[45] Jun. 7, 1983

[54] DISC-SHAPED RECORDING MEDIUM REPRODUCING APPARATUS

[75] Inventors: Takashi Yamamura, Yokohama; Osamu Tajima, Ayase, both of Japan

[73] Assignee: Victor Company of Japan, Ltd., Yokohama, Japan

[21] Appl. No.: 249,738

[22] Filed: Mar. 31, 1981

[30] Foreign Application Priority Data

Mar. 31, 1980 [JP] Japan .................................. 55-41623

[51] Int. Cl.$^3$ .......................... G11B 9/06; G11B 19/20
[52] U.S. Cl. ..................................... 369/270; 346/137; 369/77
[58] Field of Search ........................ 369/77, 271, 270; 346/137

[56] References Cited

U.S. PATENT DOCUMENTS

| 3,871,663 | 3/1975 | Stave ................................... 369/270 |
| 3,970,317 | 7/1976 | Kirschner ............................ 369/270 |
| 4,196,906 | 4/1980 | Torrington ........................... 369/77 |
| 4,218,065 | 8/1980 | Van der Hoek et al. ........... 369/271 |

FOREIGN PATENT DOCUMENTS

2017381 10/1979 United Kingdom .

Primary Examiner—Steven L. Stephan
Attorney, Agent, or Firm—Louis Bernat

[57] ABSTRACT

A reproducing apparatus reproducing a disc-shaped recording medium which is accommodated within a case. The case comprises a jacket which has a space for accommodating the disc-shaped recording medium and an opening for allowing the disc-shaped recording medium to go in and out of the jacket, and a lid member inserted through the opening of the jacket for closing the opening of the jacket, the reproducing apparatus comprises a holding mechanism for holding and leaving the disc-shaped recording medium inside the reproducing apparatus when the case is inserted into and then pulled out from within the reproducing apparatus in a direction opposite to the direction of the insertion and a clamping mechanism for clamping the disc-shaped recording medium on a turntable. The clamping mechanism comprises a support member which is unitarily rotatable with the turntable and capable of independently moving up and down with respect to the turntable, for supporting the disc-shaped recording medium at the vicinity of a center opening thereof, a moving mechanism for moving the support member upwards and downwards, clamping fingers provided in the support member, for pressing against the disc-shaped recording medium near the center opening thereof to clamp the disc-shaped recording medium on the turntable when operated, and an operating mechanism for rendering the clamping fingers into an operational state upon completion of the downward movement of the support member. The clamping fingers are positioned at an inoperative position when the support member is being raised.

8 Claims, 6 Drawing Figures

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped information recordingly medium in a state possible for reproduction within the reproducing apparatus when a case having a lid for accommodating the recording medium therein is inserted into and then pulled out from within the reproducing apparatus, and also capable of incasing the recording medium within the case so that the recording medium can be obtained outside the reproducing apparatus together with the case, when the empty case is inserted into and then pulled out from within the reproducing apparatus. The present invention further and especially relates to the above reproducing apparatus in which clamping fingers for clamping the disc-shaped recording medium which is placed on a turntable, are provided in a member which moves the disc-shaped recording medium up and down.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc case which has a lid and accommodates a disc therein, from within the reproducing apparatus. As a conventional apparatus of this type, there is an apparatus which cooperates with a disc case comprising a rigid jacket for accommodating a disc, and a tray having a front part which is engaged by engaging means upon complete insertion of the disc case within the reproducing apparatus and an annular or ring portion fixed to the front part for encircling the outer periphery of the disc. This conventional reproducing apparatus is constructed so that when this the disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the above disc case, for use with the conventional reproducing apparatus, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

Accordingly, in United States patent application entitled "DISC-SHAPED RECORDING MEDIUM REPRODUCING APPARATUS" in which the assignee is the same as that of the present application, a reproducing apparatus was proposed which cooperates with a disc case having a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an innermost part on the opposite side from the inserting opening with respect to the turntable, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

On the other hand, as a mechanism for clamping the disc on the turntable, a mechanism can be considered in which clamping fingers are assembled within a central hub which is inserted into the center hole of the disc. However, sufficient clamping force cannot be obtained by the above construction, and accordingly, the warp of the disc, especially the reverse V-shaped warp, cannot be corrected. Furthermore, there was a disadvantage in that it is difficult to introduce negative pressure in the air for holding the disc by suction on the turntable upon high-speed rotation of the turntable, and stable rotation of the disc could not be obtained.

SUMMARY OF THE INVENTION

Accordingly, a general object of the present invention is to provide a novel and useful disc-shaped recording medium reproducing apparatus in which the above described problems have been eliminated.

Another and more specific object of the present invention is to provide a disc-shaped recording medium reproducing apparatus having holding means for holding a disc accommodated within a jacket and lowering means for lowering and placing the disc on a turntable, where the reproducing apparatus is further provided with means for clamping the disc placed on the turntable.

Further objects and features of the present invention will be apparent from the following detailed description when read in conjunction with the accompanying drawings.

DETAILED DESCRIPTION

Figure 1:
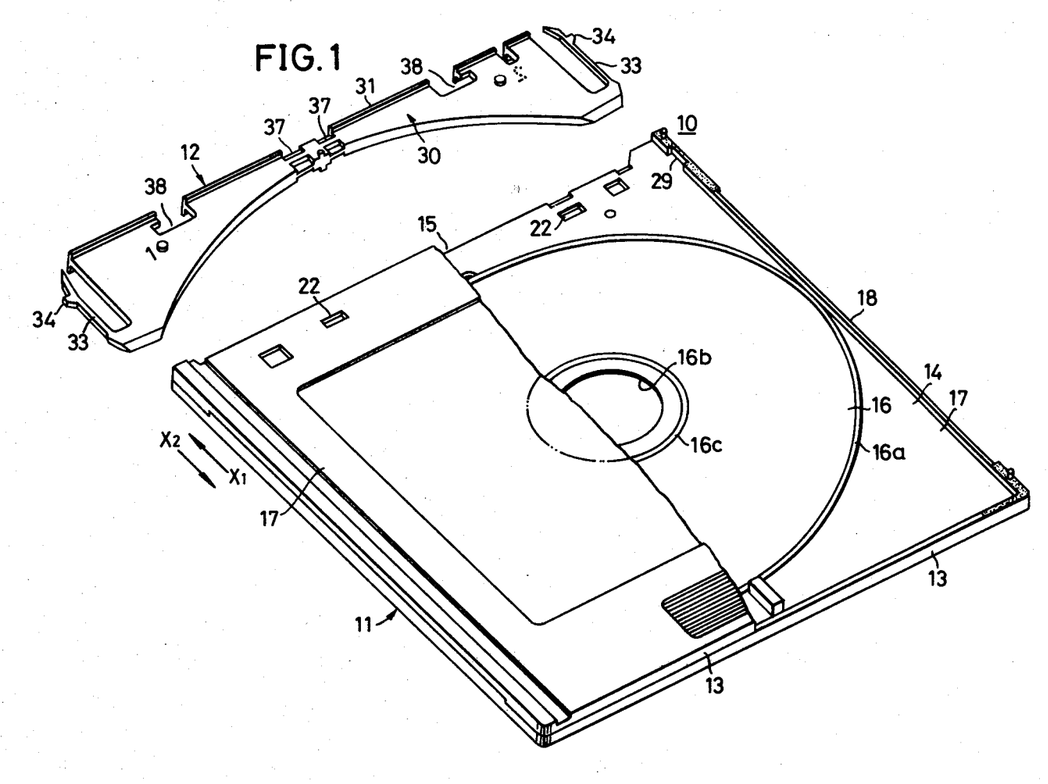
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 is open at an opening 15 at the front side of the jacket 11 and is closed on the other three sides, and accommodates a disc 16. Each of the jacket halves 13 comprises a flat plate part 17 and a rib 18 which is unitarily formed with the flat plate part 17 and are continuous in the three sides. A pair of engaging windows 22 are provided on the flat plate part 17. The lid plate 12 comprises a plate-shaped main lid body 30 which is inserted into the front portion of the space 14 through the opening 15 of the jacket 11 and closes the opening 15, and a rim portion 31 formed unitarily at the front edge of the main lid body 30, which is fixed to the front edge of the jacket 11 and does not enter within the opening 15. The lid plate 12 is, for example, made of acrylonitrile butadiene styrene (ABS) resin. A pair of engaging arms 33 are formed on both sides of the main lid body 30. A projection 34 which engages with a depression 29 of the jacket 11 is provided at the outer side on each of the engaging arms 33. Upon insertion of the lid plate 12 into a predetermined position within the jacket 11, the projection 34 engages into the depression 29 in the side wall of the jacket 11, due to the flexibility of the engaging arm 33, and the lid plate 12 is thus prevented from slipping out from the jacket 11. Holding finger ride-over parts 37 are formed at the central part of the main lid body 30. A pair of L-shaped cutouts 38 are formed at the front end of the main lid body 30 through the rim portion 31.

Figure 2:
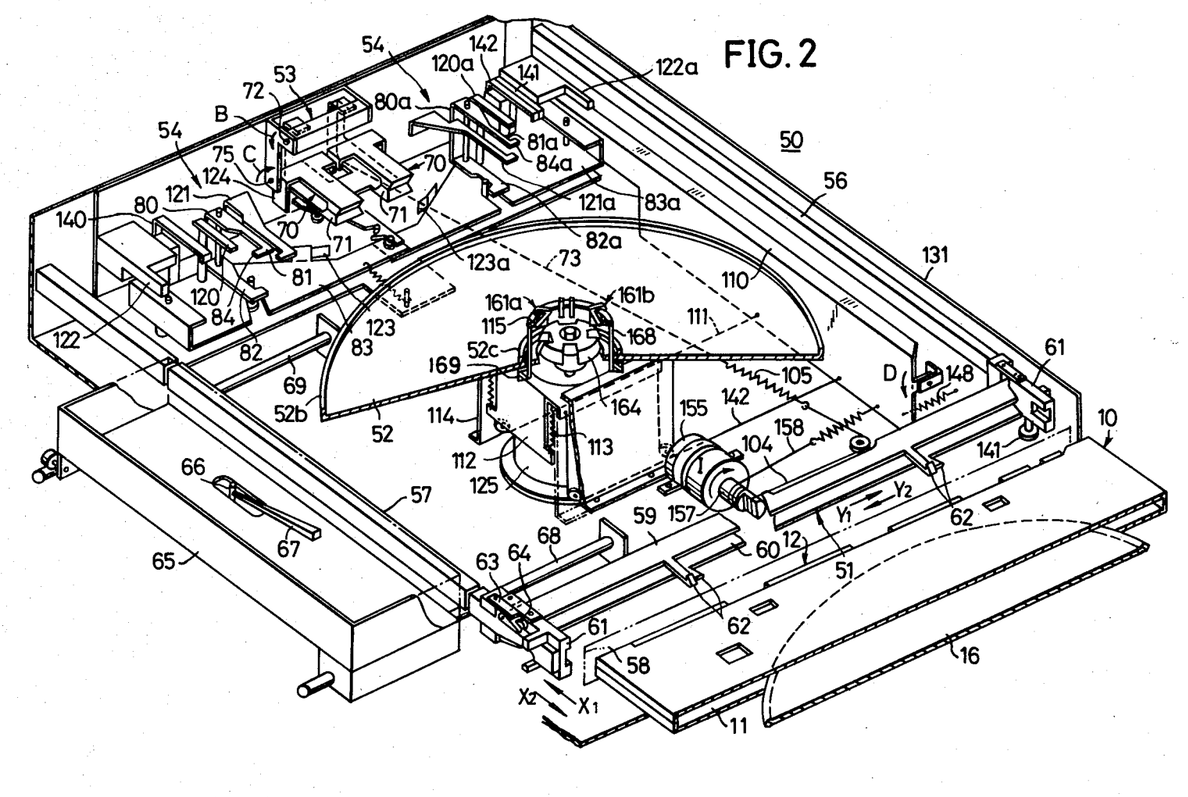
FIG. 2 is a perspective view showing the inner construction of a disc reproducing apparatus according to the present invention, with a part cut away.

As shown in FIG. 2, a reproducing apparatus 50 substantially comprises a jacket opening enlarging mechanism 51, a turntable 52 to rotate the disc 16 positioned thereon, a disc holding mechanism 53 for clamping the disc 16, a lid plate locking mechanism 54 for locking the lid plate 12, and the like.

Both sides of the jacket opening enlarging mechanism 51 are guided by guide rails 56 and 57, and the enlarging mechanism 51 moves between the innermost part of the reproducing apparatus 50 and a disc case inserting opening 58 provided at the frame of the reproducing apparatus 50, in the directions of the arrows X1 and X2. Upper and lower beams 59 and 60 extend in the directions of the arrows Y1 and Y2, and both ends of the respective beams 59 and 60 are supported by supporting members 61 and 61 (sliders). These supporting members 61 are respectively fixedly inserted into the guide rails 56 and 57. Enlarging fingers 62 are respectively formed on each of the beams 59 and 60, in a direction facing the inserting opening 58 of the reproducing apparatus 50. When the enlarging fingers 62 are positioned on the side of the inserting opening 58, a roller 64 enters inside a tapered depression, due to the action of a leaf spring 63. When the beams 59 and 60 move in the direction of the arrow X1, the roller 64 rides over the tapered depression, and the enlarging fingers 62 rotate in upward and downward directions so as to mutually separate from each other. A pickup frame 65 is provided with a reproducing stylus 66 and a cantilever 67, and moves in the directions of the arrows Y1 and Y2 along a pair of guide rods 68 and 69.

The disc holding mechanism 53 and the lid plate locking mechanism 54 are constructed symmetrically on the left and right sides with respect to a line which passes through the center of the turntable in the direction of the arrow X1. The parts on one side are designated by the same reference numerals as the corresponding parts on the other side, with a subscript "a", and their description will be omitted.

The disc holding mechanism 53 is provided at the inner part of the reproducing apparatus 50 on the opposite side of the inserting opening 58, and comprises a pair of upper and lower holding fingers 70 and 71. The lower holding finger 71 is axially supported on an upper pin 72. A wire 73 is linked to the holding finger 71, and the holding finger 71 receives a rotational force in the direction of arrow B due to the force of a spring mechanism 74. Accordingly, the holding finger 71 receives a force urging rotation in the upward direction. The upper clamping finger 70 is axially supported by a pin 75.

Upon reproduction of the disc 16, the disc case 10 is inserted through the inserting opening 58 of the reproducing apparatus 50, by inserting the disc case 10 with the side of the lid plate 12 into the direction of the arrow X1. When the jacket opening enlarging mechanism 51 is pushed and moved in the direction of the arrow X1 by the disc case 10. When the enlarging mechanism 71 moves, the roller 64 slips out of the tapered part to rotate the upper and lower beams 59 and 60, and the enlarging fingers 62 thus respectively move in a direction to mutually separate from each other. Accordingly, the tip ends of the enlarging fingers 62 engage with the engaging windows 22 of the jacket 11, and enlarge the front part of the upper and lower jacket halves 13 upwards and downwards, to enlarge the opening 15.

A sloping surface of a rotary plate 110 is pushed by a roller (not shown) provided on the slider, and the rotary plate 110 rotates in the direction of the arrow D, due to the movement of the jacket opening enlarging mechanism 51. Accompanied by the rotation of the rotary plate 110, a wire 111 is pulled, and a push-up plate 112 is accordingly pulled downwards. Four corners of the push-up plate 112 are suspended and supported by springs 113 with respect to a support plate 114. Due to the downward movement of the push-up plate 112, the push-up body 115 which is capable of unitarily rotating with the turntable 52 and moving up and down, moves downwards, to retreat from the insertion passage of the disc case 10.

When the disc case 10 is inserted into the innermost part of the reproducing apparatus 50 together with the enlarging mechanism 51 through the upper side of the turntable 52, the ride-over parts 37 of the lid plate 12 enter between the holding parts which are positioned mutually opposite to the holding fingers 70 and 71, and pass through these holding parts by pushing and spreading these parts. The holding fingers 70 and 71 close after the ride-over parts 37 of the lid plate 12 have passed through, and the holding parts accordingly clamp a groove guard 16a of the disc 16.

Accompanied by the insertion of the disc case 10, the locking fingers 81 and 81a relatively enter inside the cutouts 38 of the lid plate 12, and the rim portion 31 accordingly pushes contact fingers 120 and 120a. When the contact fingers 120 and 120a are pushed by the lid plate 12, main levers 83 and 83a respectively rotate. Furthermore, the locking fingers 81 and 81a rotate in directions so as to mutually separate from each other, and L-shaped parts 84 and 84a provided at the tip ends of the above locking fingers 81 and 81a respectively enter into the innermost parts of the cutouts 38, to lock the lid plate 12. The lid plate 12 is limited of its movement in the direction of the arrow X1 by contact fingers 120 and 120a, and the lid plate 12 is thus locked and supported at the innermost part of the reproducing apparatus 50 in a state in which the lid plate 12 is placed and supported on supporting fingers 121 and 121a.

Furthermore, engagement releasing members 122 and 122a enter inside the openings on the left and right sides of the disc case 10, and push the sloping surfaces at the tip ends of the engaging arms 33. Accordingly, the engaging arms 34 are respectively distorted inwards, and the projections 34 respectively slip out from the depressions 29, to release the engagement of the lid plate 12 with respect to the jacket 11.

When the main levers 83 and 83a rotate to positions where they are latched, the leaf springs 123 and 123a respectively provided at the bent parts of the main levers push against a vertically extending part 124 of the upper holding finger 70. Hence, a rotational force in the direction of the arrow C is applied to the holding finger 70. Thus, the disc 16 is held at a predetermined height by the lower holding finger 71 and the upper holding finger 70.

Accordingly, when the disc case 10 is inserted into the final position, the engagement of the lid plate 12 with respect to the jacket 11 is released, and the disc 16 thus becomes locked by the locking fingers 81 and 81a, and held by the holding fingers 70 and 71.

Next, the jacket 11 is pulled out in the direction of the arrow X2. Since the lid plate 12 and the disc 16 are respectively locked and clamped as described above, only the jacket 11 is moved in the direction of the arrow X2, leaving behind the lid plate 12 and the disc 16. Accompanied by this pulling out of the jacket 11, the lid plate 12 and the disc 16 are relatively pulled out from within the jacket 11. Because the opening 15 of the jacket 11 is in an enlarged state then, there is no possibility of the disc 16 being scratched by sliding against the inner surfaces of the jacket 11.

Accompanied by the movement of the jacket 11 in the direction of the arrow X2, the jacket opening enlarging mechanism 51 also moves together with the jacket in the direction of the arrow X2, since the step part of the jacket opening enlarging fingers 62 engages with the engaging windows 22 of the jacket 11. When the jacket 11 is pulled out to the vicinity of the inserting opening 58, the rotary plate 110 rotationally returns due to a spring 148 and the push-up body 115 moves up to support the center part of the disc 16. Furthermore, when the jacket 11 is pulled out, the disc 16 completely separates from the jacket 11, the jacket opening enlarging mechanism 51 returns to its original position, and the jacket opening enlarging fingers 62 rotate in directions so as to mutually close upon each other and separate from the engaging windows 22. The jacket 11 returns to its original state due to its flexibility, and the enlarged opening 15 also returns to the original state, and the jacket 11 is completely pulled out from the reproducing apparatus 50. In this state, the disc 16 is supported horizontally at a position above the turntable 52, by the clamping fingers 70 and 71 and the push-up body 115.

When a play button (not shown) is then pushed, a motor 155 begins to rotate, and a take-up shaft 157 rotates in the direction of arrow I, and hence wires 104 and 158 are thus pulled out from the take-up shaft 157. Accordingly, the rotary plate 110 rotates in the direction of the arrow D, due to the spring 148 and the holding finger 70 rotates in a direction opposite to the direction of the arrow B, to release the clamping with respect to the disc 16 and move the push-up body 115 downwards. Hence, the disc 16 moves down and is placed on the turntable 52, and clamped by a clamping mechanism which will be described hereinafter. The push-up plate 112 is then separated from the push-up body 115. A pickup frame 88 moves in the direction of the arrow Y1 from the waiting position, and the turntable 52 is rotated by a motor 125. Thus, the disc 16 is relatively scanned by the reproducing stylus 66, to reproduce the information signal.

Next, an operation in which the disc 16 is recovered from within the reproducing apparatus 50, will now be described.

Upon completion of the reproducing operation, the motor 155 rotates in a direction opposite to the direction as the above after the motor 125 and the turntable 52 stop rotating, and the take-up shaft 157 takes up the wires 104 and 158. Accordingly, the rotary plate 110 rotates in a direction so as to loosen the wire 111, and the push-up body 115 thus moves up to push the disc 16 up. Furthermore, the holding finger 70 rotates in the direction of the arrow B, to hold the disc 16. Therefore, the holding operation by the holding finger 70 is performed after the disc 16 is pushed upwards by the push-up body 115, and the disc 16 is then positively clamped.

Upon recovering of the disc 16, the empty jacket 11 is inserted with its front end first into the reproducing apparatus 50 through the inserting opening 58. The jacket opening enlarging mechanism 51 is pushed by the jacket 11 and moves again in the direction of the arrow X1, to enlarge the opening 15 of the jacket 11. Accompanied by the insertion of the jacket 11 in the direction of the arrow X1, the disc 16 is relatively inserted inside the jacket 11 through the opening 15.

Accompanied by the above insertion of the jacket 11, the rotary plate 110 is rotated after inserting of the disc 16 into the jacket 11 is started, and the push-up body 115 moves down to a lower position to recede from the moving passage of the jacket 11.

When the jacket 11 is inserted into the innermost position inside the reproducing apparatus 50, the disc 16 becomes completely incased within the jacket 11, and furthermore, the locked lid plate 12 is relatively inserted within the opening 15 of the jacket 11.

When the jacket 11 is inserted into the final position, the disc 16 is accommodated within the jacket 11, and the main part of the lid plate 12 which has been locked, is inserted inside the jacket opening 15.

Therefore, when the jacket 11 is pulled out in the direction of the arrow X2, the lid plate 12 then moves in the direction of the arrow X2 together with the jacket 11, and the disc 16 is pushed by the lid plate 12 and forcibly pushed out in the direction of the arrow X2 by the holding part. Accordingly, the disc 16 is accommodated within the jacket 11 and moves together with the jacket 11, in a state where the disc 16 is prevented from slipping out of the jacket 11 by the lid plate 12, and separates from the reproducing apparatus 50 to be recovered within the disc case 10.

Figure 3:
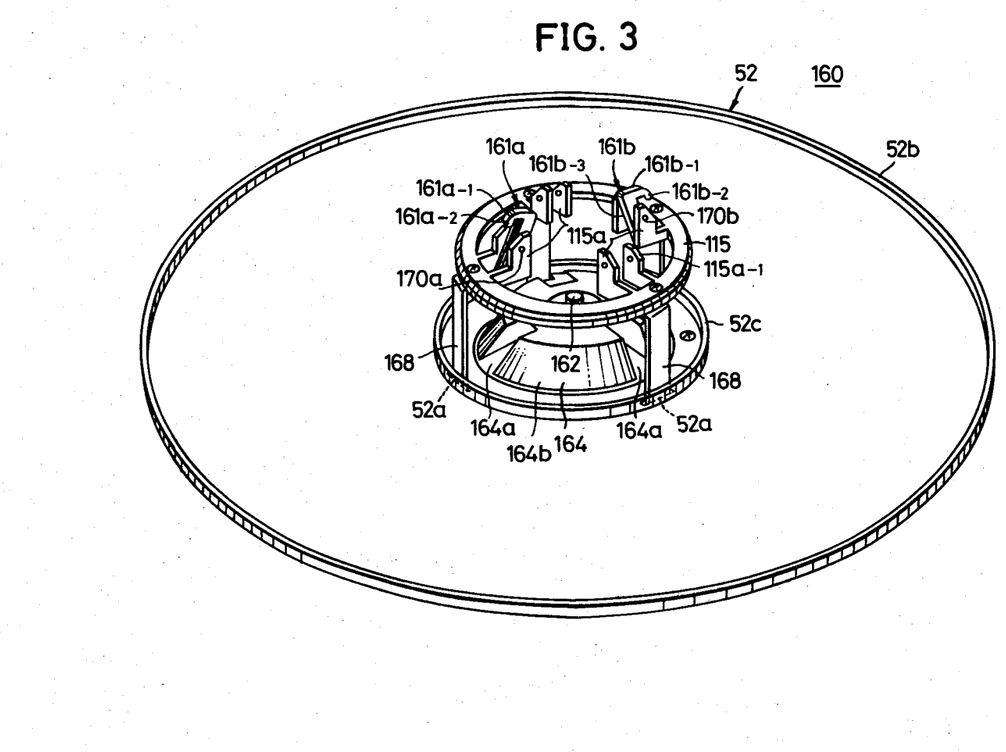
FIG. 3 is a perspective view showing a first embodiment of a clamping mechanism which constitutes the essential part of the reproducing apparatus according to the present invention.
Figure 4:
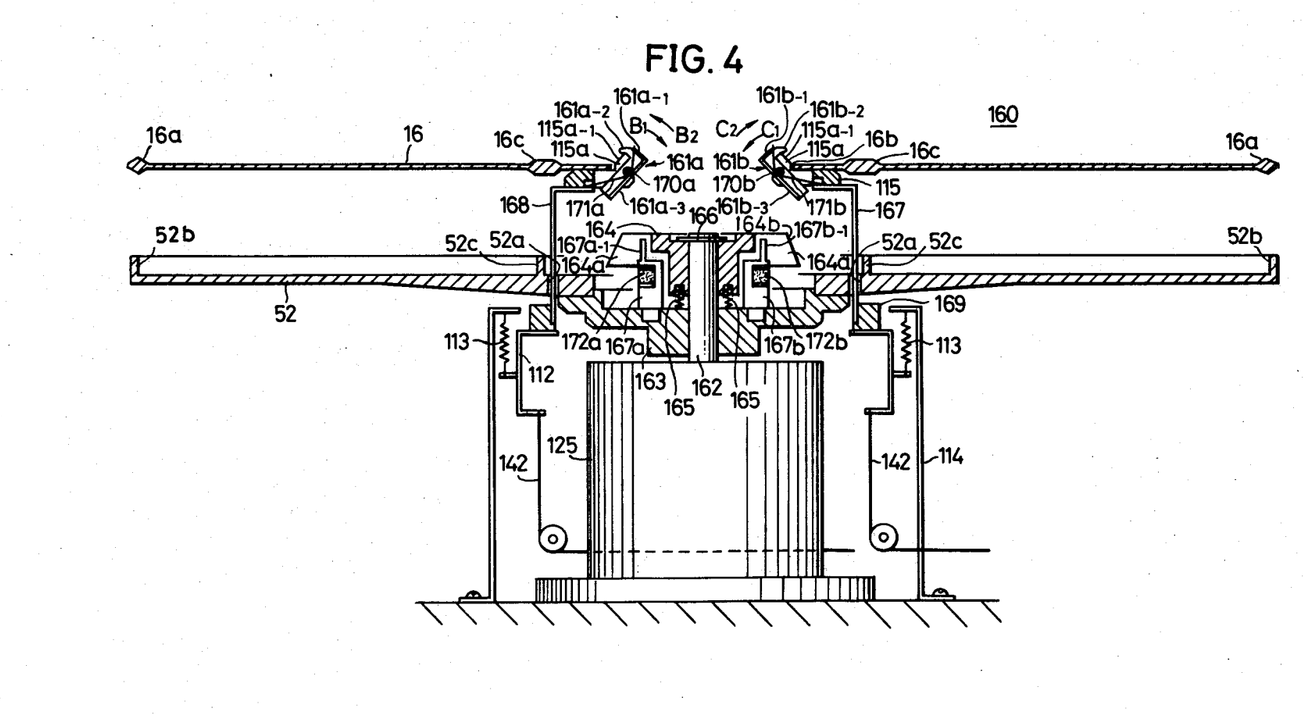
FIGS. 4 and 5 are cross-sectional diagrams respectively showing the clamping mechanism shown in FIG. 3 in an unclamped state and a locked state.
Figure 5:
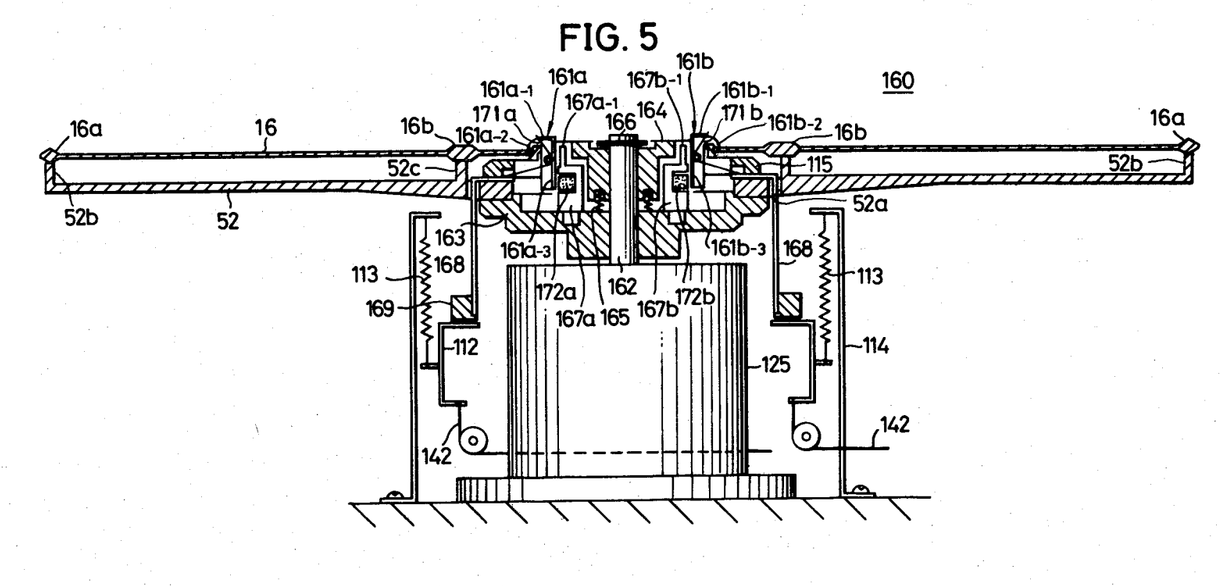

Next, a first embodiment of a mechanism for clamping the disc on the turntable, which constitutes an essential part of the reproducing apparatus according to the present invention, will now be described in conjunction with FIGS. 3 through 5. In FIGS. 3 through 5, those parts which are the same as those corresponding parts in FIG. 2 will be designated by the like reference numerals, and their description will be omitted.

A disc clamping mechanism 160 comprises disc clamping fingers 161a and 161b which are provided on the push-up body 115. The disc clamping mechanism 160 is in a state shown in FIG. 4 when the disc is not being clamped, and in a state shown in FIG. 5 upon clamping of the disc.

A flange 163 is fixed on a rotary shaft 162 of the motor 125, and the turntable 52 is fixed to this flange 163. In addition, a hub 164 of a circular truncated cone shape fits over the rotary shaft 162 in a freely slidable manner. The hub 164 is urged in the upward direction by springs 165, and makes contact with a washer 166 for preventing the hub 164 from slipping out. Cutouts 164a are formed at the periphery of the hub 164, for receiving the clamping fingers 161a and 161b and the like. Moreover, magnet holders 167a and 167b are vertically fixed on the flange 163. The cutouts 164a of the hub 164 are fitted with the magnet holders 167a and 167b, and the hub 164 rotates unitarily with the flange 163.

The push-up body 115 is fixed at the curved tip end portion of a plurality of legs 168 extending upwards through longitudinal openings 52a of the turntable 52. The lower parts of the legs 168 are fixed to a lift ring 169. Accordingly, the push-up body 115 and the lift ring 169 are movable upwards and downwards with respect to the turntable 52, and rotate unitarily with the turntable 52. The lift ring 169 makes contact with the push-up plate 112 and is supported, in the state shown in FIG. 4.

The disc clamping fingers 161a and 161b are provided on the push-up body 115 at opposing positions in the diametral direction of the ring-shaped push-up body 115. Each of the clamping fingers 161a and 161b are made of soft iron which can be attracted by a magnet. The clamping fingers 161a and 161b are shaped in the form of an L-shape, and respectively comprise arm portions 161a-1 and 161b-1 and leg portions 161a-3 and 161b-3. Projections 161a-2 and 161b-2 are respectively formed at the tip ends of the arm portions 161a-1 and 161b-1. The parts substantially at the centers of the leg portions 161a-3 and 161b-3 are respectively axially supported by pins 170a and 170b, and the clamping fingers 161a and 161b are respectively supported by L-shaped brackets 115a provided at the inner peripheral part of the push-up body 115. Furthermore, the arm portions 161a-1 and 161b-1 of the clamping fingers 161a and 161b are respectively urged to rotate in a direction (in the directions of the arrows B1 and C1) so as to recede in the inner peripheral side of the push-up body 115 by torsion springs 171a and 171b, and the arm portions 161a-1 and 161b-1 are positioned on the inner peripheral side compared to the L-shaped brackets 115a when the push-up body 115 is moving upwards. In addition, the L-shaped bracket parts 115a are arranged at four positions along the peripheral direction on the push-up body 115, and has sloping parts 115a-1 formed thereon for guiding a center hole 16b of the disc 16.

Permanent magnets 172a and 172b are fixed to the above magnet holders 167a and 167b. Furthermore, guiding parts 167a-1 and 167b-1 for guiding the lowering clamping fingers 161a and 161b, are respectively formed at the top portions of the magnet holders 167a and 167b.

Next, description will be given with respect to the above mechanism.

First, when the case 10 is inserted within the reproducing apparatus 50 upon reproduction of the disc 16, the push-up body 115 moves downwards, and recedes from the case inserting passage as described above.

When the jacket 11 is pulled out in the direction of the arrow X2 in a state where the disc 16 is held by the holding mechanism 70, the push-up body 115 is pushed up by the push-up plate 112 and moves upwards as shown in FIG. 4. Accordingly, the L-shaped bracket parts enter within the center hole 16b of the disc 16, and the push-up body 115 supports the disc 16. At this point, the arm portions 161a-1 and 161b-1 of the clamping fingers 161a and 161b are both receded on the inner peripheral side of the push-up body 115, and the clamping fingers 161a and 161b also enter within the center hole of the disc.

Even when some deviation in position exist with respect to the position of the disc 16 upon pulling out of the jacket 11, the center hole 16b of the disc 16 is guided by the sloping surfaces 115a-1 of the L-shaped brackets 115a. Therefore, the position of the disc 16 is corrected into a predetermined position, and supported on top of the turntable 52 in this state in which the position of the disc is corrected. Furthermore, the clamping fingers 161a and 161b are respectively rotated in the directions of the arrows B1 and C1, and the clamping fingers 161a and 161b respectively enter within the center hole 16b without striking against the disc 16.

When the play operation is initiated after the jacket 11 is pulled out, the holding of the disc 16 by the holding mechanism 70 is released, as described above. Moreover, the push-up body 115 moves downwards, and the disc 16 is placed on the turntable 52 and clamped as shown in FIG. 5.

Accordingly, the push-up plate 112 moves downwards to a position where a gap is formed between the lift ring 169, and the push-up body 115 moves downwards to a position where the push-up body 115 makes contact with the turntable 52. The disc 16 moves downwards together with the push-up body 115. The L-shaped brackets 115a of the push-up body 115 and the clamping fingers 161a and 161b enter within the cutouts 164a of the hub 164. When the push-up body 115 moves downwards to the position where the push-up body 115 makes contact with the turntable 52, the disc 16 separates from the push-up body 115. Thus, the outer peripheral groove guard 16a of the disc 16 is supported by an outermost peripheral projecting rim 52b of the turntable 52, and the inner peripheral groove guard 16c of the disc 16 is supported by a central projecting rim 52c of the turntable 52.

In addition, the leg portions 161a-3 and 161b-3 are respectively guided by guiding parts 167a-1 and 167b-1 when the clamping fingers 161a and 161b respectively enter within the cutouts 164a, and the clamping fingers 161a and 161b respectively rotate in the directions of the arrows B2 and C2. Accordingly, the lower ends of the leg portions 161a-3 and 161b-3 of the clamping fingers 161a and 161b respectively move near the permanent magnets 172a and 172b, and are respectively drawn towards the permanent magnets 172a and 172b. The clamping fingers 161a and 161b are thus urged to rotate in the directions of the arrows B2 and C2, due to the attracting force exerted by the permanent magnets 172a and 172b. The projections 161a-2 and 161b-2 respectively press the peripheral edge parts and its vicinity of the center hole 16b in the disc 16, in the downward direction. Hence, the inner peripheral groove guard 16c of the disc 16 is pushed against the central projecting rim 52c of the turntable 52 with a considerable force.

The guiding parts 167a-1 and 167b-1 are made from a non-magnetic material. Thus, the clamping fingers 161a and 161b are not unnecessarily attracted to the guiding parts 167a-1 and 167b-1, and are attracted to the permanent magnets 172a and 172b. In addition, the projections 161a-2 and 161b-2 respectively deviate along arcuate loci when pushing the disc 16 down, and moves over the disc surface by slightly sliding. Hence, the edges of the projections 161a-2 and 161b-2 are rounded, as that this sliding movement can be performed smoothly.

The center hole 16b of the disc 16 makes contact with a conical surface 164b of the hub 164, at a stage before the clamping fingers 161a and 161b operates. Accordingly, the hub 164 is slightly pushed downwards by the disc 16 against the force of the spring 165, and pushes against the center hole 16b of the disc 16 due to the action of the spring 165. Therefore, the center position of the disc 16 is automatically aligned with the center of the turntable 52 by the hub 164, and the disc 16 is accordingly clamped on the turntable 52 in this state.

When the peripheral part of the disc 16 is warped upwards, the inner groove guard 16c of the disc makes contact with the central projecting rim 52c. Thus, no suction of air is introduced, and the outer peripheral part of the disc makes contact with the turntable due to the action of a negative pressure introduced at a space between the disc and the turntable upon high-speed rotation of the turntable. However, when the peripheral part of the disc 16 is warped downwards, the inner groove guard 16c of the disc does not make contact with the central projecting rim 52c, that is, a space is formed between the inner groove guard 16c and the central projecting rim 52c of the turntable 52. Since an air passage is formed due to this space between the inner groove guard 16c and the central projecting rim 52c, the above described negative pressure is not easily introduced, and the warp in the disc 16 cannot be corrected. However, by operating a clamping force in the vicinity of the center hole 16b of the disc, the warp in the disc can be corrected even when the peripheral part of the disc is warped downwards. Accordingly, the inner groove guard 16c of the disc makes contact with the central projecting rim 52c, and a negative pressure can effectively be introduced upon high-speed rotation of the turntable 52. Moreover, the disc 16 is rotated in a state where the disc 16 is rigidly placed on the turntable 52, due to the clamping force exerted by the clamping fingers 161a and 161b and the negative pressure.

The motor 155 rotates in the reverse direction when an operation is performed to finish reproduction, and the push-up body 115 moves upwards as described above. In this state, the clamping fingers 161a and 161b respectively move in directions so as to slide on the sides of the permanent magnets 172a and 172b, and the resistive forces with respect to these movements are small. Due to the upward movement of the push-up body 115, the disc 16 moves upwards in a state where the disc 16 is supported by the push-up body 115. Accordingly, the clamping fingers 161a and 161b respectively rotate in the directions of the arrows B1 and C1, due to the action of the springs 171a and 171b as shown in FIG. 4.

Upon reproduction of the disc 16, no slippage is introduced between the disc 16 and the turntable 52 when starting a high-speed rotation of the turntable, since the disc 16 is clamped by the above clamping fingers 161a and 161b. Moreover, the static electricity of the disc 16 is grounded through the clamping fingers 161a and 161b, the torsion springs 171a and 171b, and the like, when the disc 16 is clamped by the clamping fingers 161a and 161b. The lift ring 169 rotates together with the turntable 52 in a state where the lift ring 169 is separated from the push-up plate 112.

Figure 6:
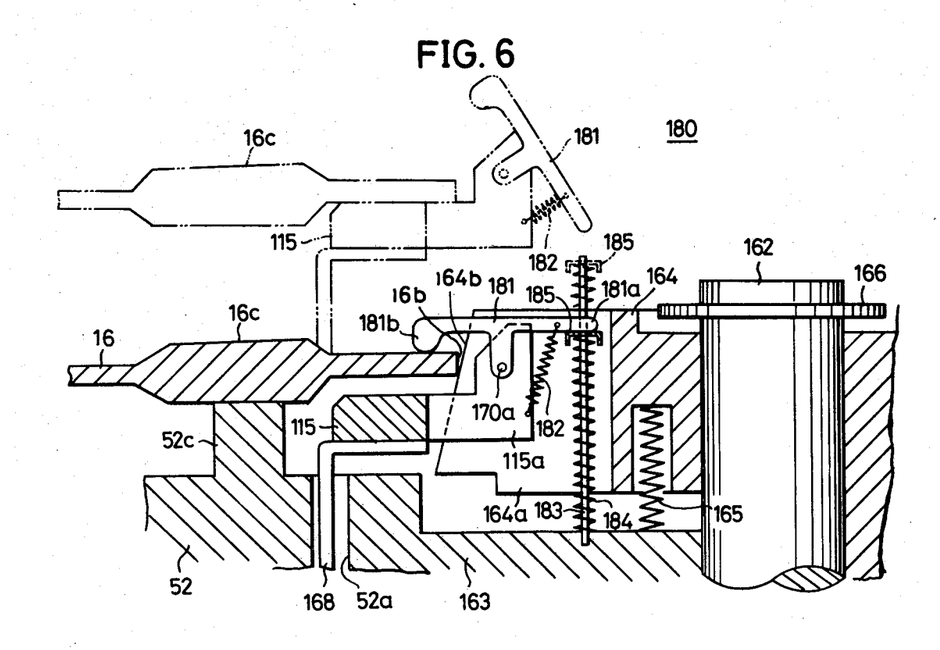
FIG. 6 is an enlarged cross-sectional diagram showing essential parts of a second embodiment of a clamping mechanism.

Next, a second embodiment of a disc clamping mechanism will be described in conjunction with FIG. 6. In the present embodiment of the invention, the clamping mechanism is consturcted so that the clamping force is obtained from forces of compressed springs. In FIG. 6, those parts which are the same as those corresponding parts in FIGS. 3 through 5 are designated by the like reference numerals, and their description will be omitted.

In a disc clamping mechanism 180 shown in FIG. 6, a clamping finger 181 is axially supported by the pin 170a in the L-shaped bracket 115a of the push-up body 115, and when the push-up body 115 is at the raised position, the clamping finger 181 is rotated in the clockwise direction due to the action of a spring 182 as shown by the two-dot chain line in FIG. 6.

A support beam 183 is embeddedly fixed to the flange 163, and this support beam 183 fits the cutout 164a of the hub 164. A compressed coil spring 184 is fitted around the support beam 183, and a cap 185 is provided at the top end of the support beam 183.

When the push-up body 115 which supports the disc 16 moves downwards, a forked portion 181a provided on one end of the clamping finger 181 fits over the support beam 183 and makes contact with the cap 185. Accordingly, the clamping finger 181 rotates in the counter clockwise direction against the force of the spring 182, due to the force exerted by the compressed coil spring 184. As shown by the solid line in FIG. 6, a projection 181b having rounded edges, of the clamping finger 181, pushes the center hole part of the disc 16 against the turntable 52, to clamp the disc 16 on the turntable 52.

Moreover, in the present embodiment of the invention, the push-up body 115 and the lift ring 168 (refer to FIGS. 4 and 5) also function as weights to introduce a resilient force in the compressed coil spring 184.

Further, this invention is not limited to these embodiments but various variations and modifications may be made without departing from the scope of the invention.

What is claimed is:

1. A reproducing apparatus for reproducing a disc-shaped recording medium which is accommodated within a case, said case comprising a jacket which has a space for accommodating said disc-shaped recording medium and an opening for allowing said disc-shaped recording medium to go into and out of said jacket, and a lid member inserted through said opening of said jacket for closing said opening of said jacket, said reproducing apparatus comprising:

holding means for holding and leaving said disc-shaped recording medium inside said reproducing apparatus when said case is inserted into and then pulled out from within said reproducing apparatus, in a direction which is opposite to the direction of the insertion;

turntable means for rotating said disc-shaped recording medium left inside said reproducing apparatus;

a hub on the turntable means for centering said disc-shaped recording medium when said disc-shaped recording medium is placed on the turntable means; and clamping means for clamping said disc-shaped recording medium on said turntable;

said clamping means having a support member which is coupled to the turntable and is capable of unitarily rotating with the turntable means and of independently moving up and down with respect to said turntable means, for supporting said disc-shaped recording medium in the vicinity of a center hole thereof and for transferring said disc-shaped recording medium to said hub and to said turntable means, a moving mechanism for moving said support member upwardly and downwardly, clamping fingers on said support member for depressing said disc-shaped recording medium in a vicinity of the center hole thereof toward said turntable means while said disc-shaped recording medium is centered by said hub for reproducing said disc-shaped recording medium, said support member being decoupled from said moving mechanism and resting on the turntable means for reproducing said disc-shaped recording medium, said clamping fingers being positioned at a standby position while said support member is being raised, and an operating mechanism for placing said clamping fingers into a clamping position upon completion of the downward movement of said support member.

2. A reproducing apparatus as claimed in claim 1 in which said clamping fingers are made of ferro-magnetic material, and said operating mechanism comprises permanent magnet members disposed within cutouts of said hub member for attracting said clamping fingers which are moving down, and to rotate said clamping fingers into a clamping state, said permanent magnet members being arranged in a manner such that magnetic surfaces thereof for attracting said clamping fingers are substantially parallel with a moving direction of said support member.

3. A reproducing apparatus as claimed in claim 2 in which said operating mechanism further comprises guiding parts disposed inside the cutouts of said hub, for guiding and rotating said clamping fingers into positions where said permanent magnet members can easily attract said clamping fingers.

4. A reproducing apparatus as claimed in claim 1 in which said operating mechanism comprises a spring member disposed within cutouts of said hub for operating on said clamping fingers which are moving down, to rotate said clamping fingers into a clamping position.

5. A reproducing apparatus as claimed claim 1 in which said clamping fingers respectively have engaging projections at their distal ends, for making contact and clamping said disc-shaped recording medium, said engaging projections being of rounded shapes.

6. A reproducing apparatus as claimed in claim 1 in which said support member has guiding parts which fit into the center opening of said disc-shaped recording medium, for correcting the position of said disc-shaped recording medium into a position directly above said turntable.

7. A reproducing apparatus as claimed in claim 1 in which said hub has cutouts formed therearound, for accommodating said clamping fingers and said guiding part therein when said support member moves down.

8. A reproducing apparatus as claimed in claim 1 in which said hub has a conical surface for centering said disc-shaped recording medium.

* * * * *